(12) United States Patent
Gonzalez et al.

(10) Patent No.: US 7,796,509 B2
(45) Date of Patent: *Sep. 14, 2010

(54) METHOD AND APPARATUS FOR MANAGING FLOW CONTROL IN A DATA PROCESSING SYSTEM

(75) Inventors: Ron Encarnacion Gonzalez, Austin, TX (US); Binh K. Hua, Austin, TX (US); Sivarama K. Kodukula, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/371,793

(22) Filed: Feb. 16, 2009

(65) Prior Publication Data
US 2009/0141627 A1 Jun. 4, 2009

Related U.S. Application Data

(63) Continuation of application No. 10/460,428, filed on Jun. 12, 2003, now Pat. No. 7,496,032.

(51) Int. Cl.
*H04L 12/26* (2006.01)
(52) U.S. Cl. .................................................... 370/229
(58) Field of Classification Search ......... 370/229–236, 370/464, 465; 709/223–225, 229–236
See application file for complete search history.

(56) References Cited

U.S. PATENT DOCUMENTS

| | | | |
|---|---|---|---|
| 5,032,987 A | 7/1991 | Broder et al. | |
| 5,905,870 A * | 5/1999 | Mangin et al. | 709/234 |
| 6,035,333 A * | 3/2000 | Jeffries et al. | 709/224 |
| 6,097,699 A | 8/2000 | Chen et al. | |
| 6,167,029 A * | 12/2000 | Ramakrishnan | 370/235 |
| 6,192,028 B1 | 2/2001 | Simmons et al. | 370/229 |
| 6,198,722 B1 | 3/2001 | Bunch | |
| 6,320,870 B1 | 11/2001 | Thaler | |
| 6,529,521 B1 * | 3/2003 | MacArthur | 370/463 |
| 6,851,008 B2 * | 2/2005 | Hao | 710/305 |
| 7,190,667 B2 | 3/2007 | Susnow et al. | |
| 7,496,032 B2 * | 2/2009 | Gonzalez et al. | 370/229 |
| 2001/0021174 A1 | 9/2001 | Luijten et al. | |
| 2002/0063932 A1 | 5/2002 | Unitt et al. | |
| 2002/0089927 A1 | 7/2002 | Fischer et al. | |
| 2002/0172205 A1 * | 11/2002 | Tagore-Brage et al. | 370/395.42 |
| 2002/0186655 A1 | 12/2002 | Kanazashi | |
| 2003/0004723 A1 | 1/2003 | Chihara | |
| 2003/0026267 A1 | 2/2003 | Oberman et al. | |
| 2003/0147347 A1 * | 8/2003 | Chen et al. | 370/229 |

OTHER PUBLICATIONS

Karol et al., "Prevention of Deadlocks and Livelocks in Lossless, Backpressured Packet Networks", http://citeseer.nj.nec.com/karol00prevention.html.

* cited by examiner

*Primary Examiner*—Dmitry H Levitan
(74) *Attorney, Agent, or Firm*—Yee & Associates, P.C.; Diana R. Gerhardt

(57) ABSTRACT

A method in a data processing system for managing transmission of pause frames. In response to detecting an overflow condition during a receipt of data from a network, enabling flow control in response to detecting the overflow condition. The flow control is enabled as long as the overflow condition is present. A determination is made as to whether the operating system unavailable after a period of time passes. If the operating system believed to have crashed and flow control is enabled, the flow control is disabled.

12 Claims, 2 Drawing Sheets

METHOD AND APPARATUS FOR MANAGING FLOW CONTROL IN A DATA PROCESSING SYSTEM

This application is a continuation of application Ser. No. 10/460,428, filed Jun. 12, 2003, status allowed.

BACKGROUND OF THE INVENTION

1. Technical Field

The present invention is an improved data processing system and in particular a method and apparatus for managing transfer of data in a data processing system. Still more particularly, the present invention provides a method, apparatus, and computer instructions for managing flow control in a data processing system.

2. Description of Related Art

A network interface card (NIC), also referred to as a network adapter, is a printed circuit board used in client and server data processing systems to control the exchange of data on a data link level. Ethernet network adapters have transmit and receive buffers to store frame data. Under ideal conditions in a network data processing system, no contention occurs for these resources. Under actual conditions, however, data may be lost due to transmit under runs or receive overruns. These conditions may result from heavy network traffic or excessive latencies within the network data processing system.

Data is lost when data packets are received faster at the network adapter than they are transmitted across the bus to the rest of the data processing system. The receive first-in-first-out (FIFO) buffer fills up and data may be lost.

Flow control is used to avoid data loss. One mechanism involves used I.E.E.E. 802.3x and involves sending a multicast "pause" frame with a pause timer value requesting the link partner to not send any data frames within the timer value. To terminate the pause condition before the timer has expired, another pause frame may be sent with a pause timer value of zero.

The flow control typically is implemented in network adapters by having the receive FIFO buffer programmed with a threshold that is used to trigger the transmission of flow control frames using preprogrammed pause timer value. The network adapter continues to transmit pause frames as long as the threshold value is exceeded. If the data in the buffer falls below the threshold value prior to the expiration of the time, another pause frame is sent with a zero time to re-enable the network operation. The pause frames are required to terminate at the receiving port of the network adapter, transmitting the data, without broadcasting these pause frames to the entire domain.

This system works well under most normal circumstances. Some early switches, however, do not comply with the standard and will broadcast the pause frames to the entire multicast group. This type of broadcasting causes excessive congestion on the network. In some cases the congestion may not be severe if the pause frame transmission is infrequent. In a case in which a data processing system has crashed and the network adapter is still powered, the continuous transmission of pause frames can slow down the entire network if the switch broadcasts these frames.

Therefore, it would be advantageous to have an improved method, apparatus, and computer instructions for managing flow control to avoid excessive congestion in a network data processing system.

SUMMARY OF THE INVENTION

The present invention provides a method in a data processing system for managing transmission of pause frames. In response to detecting an overflow condition during a receipt of data from a network, enabling flow control in response to detecting the overflow condition. The flow control is enabled as long as the overflow condition is present. A determination is made as to whether the operating system is unavailable after a period of time passes. If the operating system is believed to have crashed and flow control is enabled, the flow control is disabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
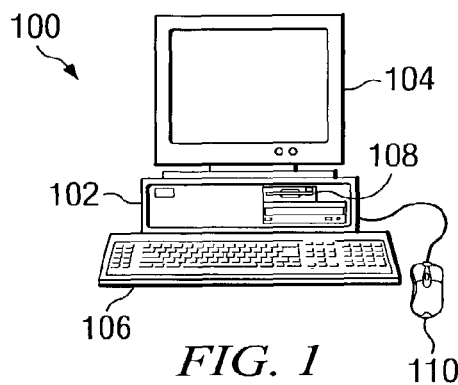
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented, is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
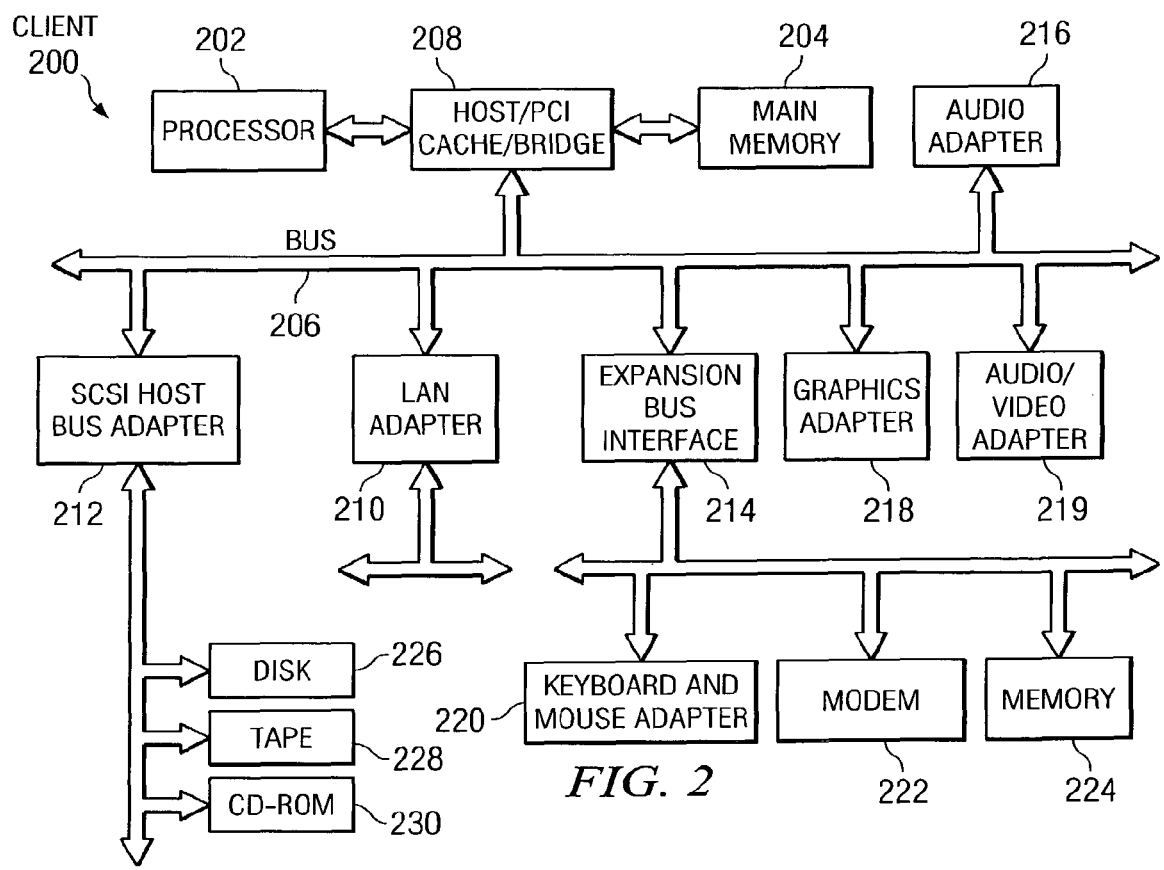
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as network adapter 210, modem 222, or the like.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer instructions for managing the transmission of pause frames when an overflow situation or condition is present in a network adaptor, such as LAN adaptor 210 in FIG. 2. The mechanism of the present invention disables flow control processes, such as the transmission of pause frames, when system activity is detected for some excessive period of time. In these examples, the transmission of pause frames by the network adaptor is stopped when it is suspected that the system is unavailable or has crashed when flow control is enabled. If it is determined that the system has not crashed, flow control is again enabled.

Figure 3:
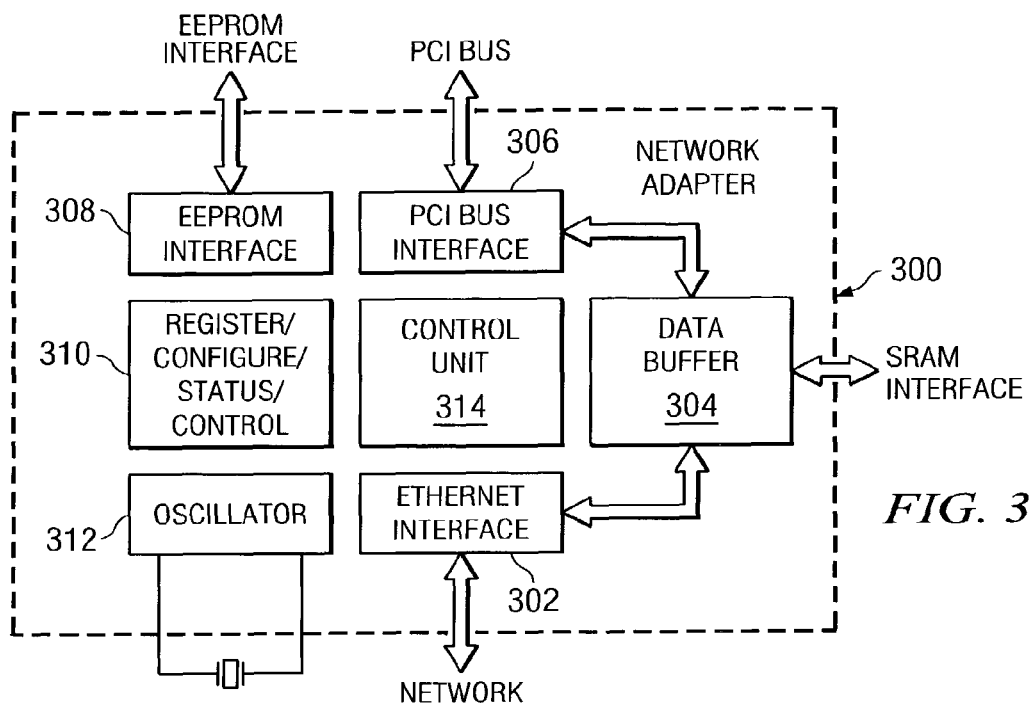
FIG. 3 is a diagram of a network adapter in accordance with a preferred embodiment of the present invention.

Turning now to FIG. 3, a diagram of a network adapter is depicted in accordance with a preferred embodiment of the present invention. Network adapter 300 may be implemented as LAN adapter 210 in FIG. 2. As shown, network adapter 300 includes Ethernet interface 302, data buffer 304, and PCI bus interface 306. These three components provide a path between the network and the bus of the data processing system. Ethernet interface 302 provides an interface to the network connected to the data processing system. PCI bus interface 306 provides an interface to a bus, such as PCI bus 206 in FIG. 2. Data buffer 304 is used to store data being transmitted and received through network adaptor 300. This data buffer also includes a connection to an SRAM interface to provide for additional storage.

Network adaptor 300 also includes electrically erasable programmable read-only memory (EEPROM) interface 308, register/configure/status/control unit 310, oscillator 312, and control unit 314. EEPROM interface 308 provides an interface to an EEPROM chip, which may contain instructions and other configuration information for network adaptor 300. Different parameters and setting may be stored on an EEPROM chip through EEPROM interface 308. Register/configure/status/control unit 310 provides a place to store information used to configure and run processes on network adaptor 300. For example, a timer value for a timer may be stored within these registers. Additionally, status information for different processes also may be stored within this unit. Oscillator 312 provides a clock signal for executing processes on network adaptor 300.

Control unit 314 controls the different processes and functions performed by network adaptor 300. Control unit 314 may take various forms. For example, control unit 314 may be a processor or an application-specific integrated chip (ASIC). In these examples, the processes of the present invention are used to manage flow control are executed by control unit 314. If implemented as a processor, the instructions for these processes may be stored in a chip accessed through EEPROM interface 308.

Data is received in receive operations through Ethernet interface 302. This data is stored in data buffer 304 for transfer onto the system across PCI bus interface 306. If an overflow condition exists, new data may not be stored on data buffer 304 because the buffer is full. This type of situation may exist when network adaptor 300 is unable to send data at a rate to reduce the data in data buffer 304 faster than data is placed into this data buffer. Such a situation is typically temporary, but may occur for extended periods of time if the operating system has crashed or some other error has made the data processing system unavailable for receiving data.

According to a preferred embodiment of the present invention, a threshold level or value is set for data buffer 304. This threshold level or value is exceeded when the amount of data stored in data buffer 304 exceeds some selected amount. This threshold value may be set at the maximum capacity of data buffer 304, or at some percentage of maximum capacity of data buffer 304 depending on the particular implementation. When data exceeding this threshold level is detected, control unit 314 enables flow control. In these examples, flow control for receiving data involves the generation and transmission of pause frames onto the network through Ethernet interface 302. These pause frames are designed to cause the source of the data on the network to halt transmission of data for some period of time set in the pause frame.

If the overflow condition continues, another pause frame is transmitted prior to the expiration of this period of time. If the threshold level is no longer exceeded in data buffer 304, control unit 314 will disable the flow control, causing the transmission of pause frames to terminate. If the period of time has not expired after the sending of the last pause frame, control unit 314 transmits a pause frame with a period of time set to zero to cause the source to start transmitting data again prior to the expiration of the period of time.

In addition, when flow control is enabled, control unit 314 initiates or starts a second timer, which is also referred to as a monitor timer. When this timer expires, the system is suspected to have crashed or be unavailable for some unacceptable period of time. At this point, the flow control is disabled. The period time for this monitored timer may be set in register/configure/status/control unit 310. The timer may be implemented as a set of instructions executed by control unit 314 if control unit 314 takes the form of a processor. Otherwise, additional circuitry may be added to an ASIC to include this feature.

After the monitor timer expires, it is assumed the system has crashed due to the inactivity. An interrupt is generated and sent to the operating system when the flow control process is disabled. If the system recovers later and sends a response to this interrupt, control unit 314 will then re-enable the flow control process.

The mechanism of the present invention is especially useful for preventing excessive traffic on a network caused by pause frames when a data processing system has crashed, but the network adaptor remains powered and active. Further, the mechanism of the present invention also may be employed for other situations in which the operating system resources have been tied up for other reasons. In these cases, the operating system may not have crashed but other applications or processes may have used up the system resources not allowing the operating system to receive data from network adaptor 300.

Figure 4:
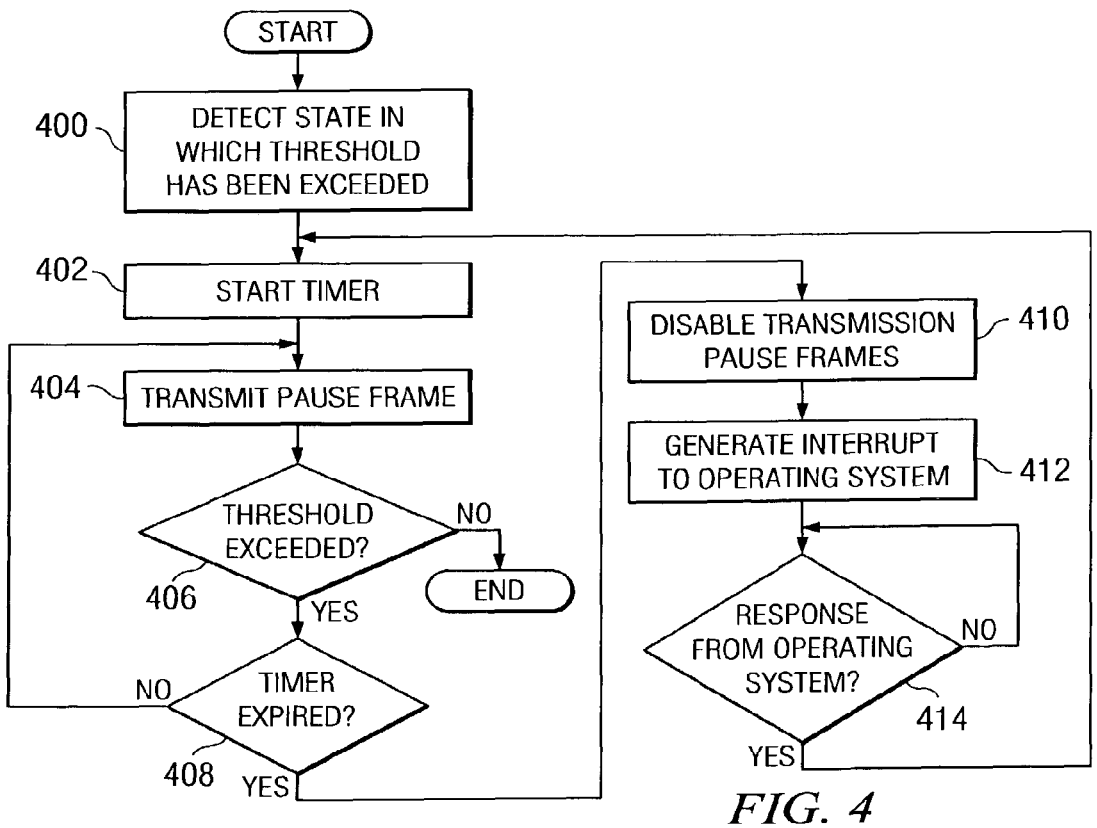
FIG. 4 is a flowchart of a process for managing flow control in a network adaptor in accordance with the preferred embodiments of the present invention.

Turning now to FIG. 4, a flowchart of a process for managing flow control in a network adaptor is depicted in accordance with the preferred embodiments of the present invention. The process illustrated in FIG. 4 may be implemented in a network adaptor, such as network adaptor 300 in FIG. 3. In particular, these processes may be implemented within circuitry or as instructions used by control unit 314 in FIG. 3.

The process begins by detecting a state in which a threshold level in a buffer has been exceeded (step 400). A timer is then started (step 402). In this example, the timer is a monitor timer. A pause frame is then transmitted (step 404). Next, a determination is made as to whether the threshold level is still exceeded for the data buffer (step 406). If the threshold level is still exceeded, a determination is made as to whether the timer has expired (step 408). If the timer has not expired, the process returns to step 404 to transmit another pause frame. These pause frames are transmitted at intervals that may vary depending on the particular implementation. These intervals may be periodic or in response to some other event.

If the timer has expired, the transmission of pause frames is disabled (step 410). The step basically disables the flow control. Thereafter, an interrupt is generated and sent to the operating system (step 412). This step is employed to determine whether the operating system has become unavailable or crashed. A determination is made as to whether a response to the interrupt is received from the operating system (step 414). If a response is received, the process returns to step 402 to restart the timer and transmit pause frames. Otherwise, the process continues to return to step 414.

Turning back to step 406, it the threshold is not exceeded, the process terminates. In this example, the process terminates because flow control is no longer needed. As a result, no pause frames are transmitted. Depending on the particular implementation, an additional step may be included in which a final pause frame is sent to the source with a value of zero to reinitiate the transmission of data immediately rather than waiting for the period of time set in the pause frame to pass if that period of time has not yet expired.

Thus, the present invention provides an improved method, apparatus, and computer instructions for managing flow control in a data processing system. In particular, this flow control disables the sending of pause frames by a network adaptor if it is suspected that the data processing system has crashed. In this manner, congestion caused by the continued transmission of pause frames may be avoided.

The present example disables the transmission of pause frames and then determines whether the operating system responds to the interrupt. In other implementations, an interrupt may be first generated to determine whether the operating system is still responsive and the pause frame transmission terminated if a response is not received after some selected period of time in response to the interrupt.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A network adapter for handling transfer of data, the network adapter comprising:

a data buffer for storing data received by the network adapter;

a control unit for detecting an overflow condition in the data buffer during a receipt of data;

the control unit for enabling a flow control, in response to detecting the overflow condition, by transmitting a pause frame from the network adapter to a sender of the data;

the control unit for making a plurality of determinations about whether the overflow condition is still present;

the control unit for transmitting a new pause frame after each determination that the overflow condition is still present, wherein a plurality of pause frames are transmitted to the sender while the overflow condition exists;

the control unit for determining whether an operating system is unavailable; and the control unit for disabling the flow control by ceasing the transmission of a new pause frame even though the overflow condition is still present when the operating system is unavailable.

2. The network adapter of claim 1, wherein the network adapter is an Ethernet network adapter.

3. The network adapter of claim 1, wherein the control unit sends an interrupt to the operating system to determine whether the operating system is unavailable, and wherein the control unit determines that the operating system is unavailable if a response to the interrupt is absent after a particular period of time.

4. The network adapter of claim 1 further comprising:
a monitor timer that is started responsive to detecting the overflow condition;
the control unit for determining whether the monitor timer has expired in response to a determination that the overflow condition is still present;
the control unit for transmitting a new pause frame in response to determining that the overflow condition is still present and determining that the monitor timer has not expired;
the control unit for sending an interrupt to the operating system in response to determining that the overflow condition is still present and determining that the monitor timer has expired; and
the control unit for determining that the operating system is unavailable in response to not receiving a response to the interrupt.

5. The network adapter of claim 1, wherein each pause frame includes an idle time during which the sender should not send additional data to the network adapter.

6. The network adapter of claim 1 further comprising:
the control unit for reenabling the flow control when the operating system becomes available.

7. A network adapter comprising:
a buffer for storing data;
a control unit for determining whether data in the buffer exceeds a threshold level;
a monitor timer that is started in response to a determination that the data in the buffer exceeds the threshold level;
the network adapter for transmitting a plurality of pause frames, which include a pause timer value, which requests the sender to halt sending additional data for storage in the buffer for the length of the pause timer value;
the control unit, after each transmission of one of the plurality of pause frames, for determining whether the monitor timer has expired and whether data in the buffer still exceeds the threshold;
the control unit for disabling transmissions of the plurality of pause frames responsive to the threshold level still being exceeded and the monitor timer having expired;
the control unit for generating an interrupt to an operating system that is being executed by a computer system that includes the network adapter;
the control unit for determining whether the network adapter has received a response to the interrupt from the operating system; and
the control unit for restarting the monitor timer and re-enabling transmissions of the plurality of pause frames only after receiving a response from the operating system to the interrupt.

8. A computer program product, which is stored in a computer non-transitory recordable medium, for handling transfer of data, the computer program product comprising:

instructions for detecting, by a network adapter, an overflow condition in a buffer in the network adapter during a receipt of data from a sender;
instructions for enabling, by the network adapter, a flow control by transmitting a pause frame from the network adapter to the sender of the data in response to detecting the overflow condition;
instructions for making, by the network adapter, a plurality of determinations about whether the overflow condition is still present;
instructions for transmitting, by the network adapter, a new pause frame after each determination that the overflow condition is still present, wherein a plurality of pause frames are transmitted to the sender while the overflow condition exists;
instructions for determining, by the network adapter, whether an operating system is unavailable; and
responsive to the operating system being unavailable, instructions for disabling, by the network adapter, the flow control by ceasing the transmission of a new pause frame even though a determination was made that the overflow condition is still present.

9. The computer program product of claim 8 further comprising:
instructions for starting a monitor timer responsive to detecting the overflow condition;
instructions responsive to a determination that the overflow condition is still present, for determining whether the monitor timer has expired;
instructions responsive to determining that the overflow condition is still present and determining that the monitor timer has not expired, for transmitting a new pause frame;
instructions responsive to determining that the overflow condition is still present and determining that the monitor timer has expired, for sending an interrupt to the operating system; and
instructions responsive to not receiving a response to the interrupt, for determining that the operating system is unavailable.

10. The computer program product of claim 8, wherein each pause frame includes an idle time during which the sender should not send additional data to the network adapter.

11. The computer program product of claim 8 further comprising:
instructions for reenabling the flow control when the operating system becomes available.

12. A computer program product, which is stored in a computer non-transitory recordable medium, for managing transmission of pause frames, the method comprising:
instructions for determining, by a network adapter, that data in a buffer in the network adapter exceeds a threshold level;
instructions for starting a monitor timer in response to the determination that the data exceeds the threshold level;
instructions for transmitting, by the network adapter to a sender of the data, a plurality of pause frames, which include a pause timer value, which requests the sender to halt sending additional data for the length of the pause timer value;
instructions for, after each transmission of one of the plurality of pause frames, determining whether the monitor timer has expired and whether the data in the buffer still exceeds the threshold;
instructions for disabling, by the network adapter, transmissions of the plurality of pause frames responsive to the threshold level still being exceeded and the monitor timer having expired;

instructions for generating, by the network adapter, an interrupt to an operating system that is being executed by a computer system that includes the network adapter;

instructions for determining, by the network adapter, whether the network adapter has received a response to the interrupt from the operating system; and instructions for restarting the monitor timer and re-enabling transmissions of the plurality of pause frames only after receiving a response from the operating system to the interrupt.

* * * * *